Oct. 18, 1966   R. HARVEY ETAL   3,279,326
STEAM ENGINE WITH SELF-CONTAINED VALVULAR MECHANISM
Filed Feb. 10, 1964   3 Sheets-Sheet 1

INVENTORS
ROBERT HARVEY
BY LEO LOMAGLIO
ATTORNEY

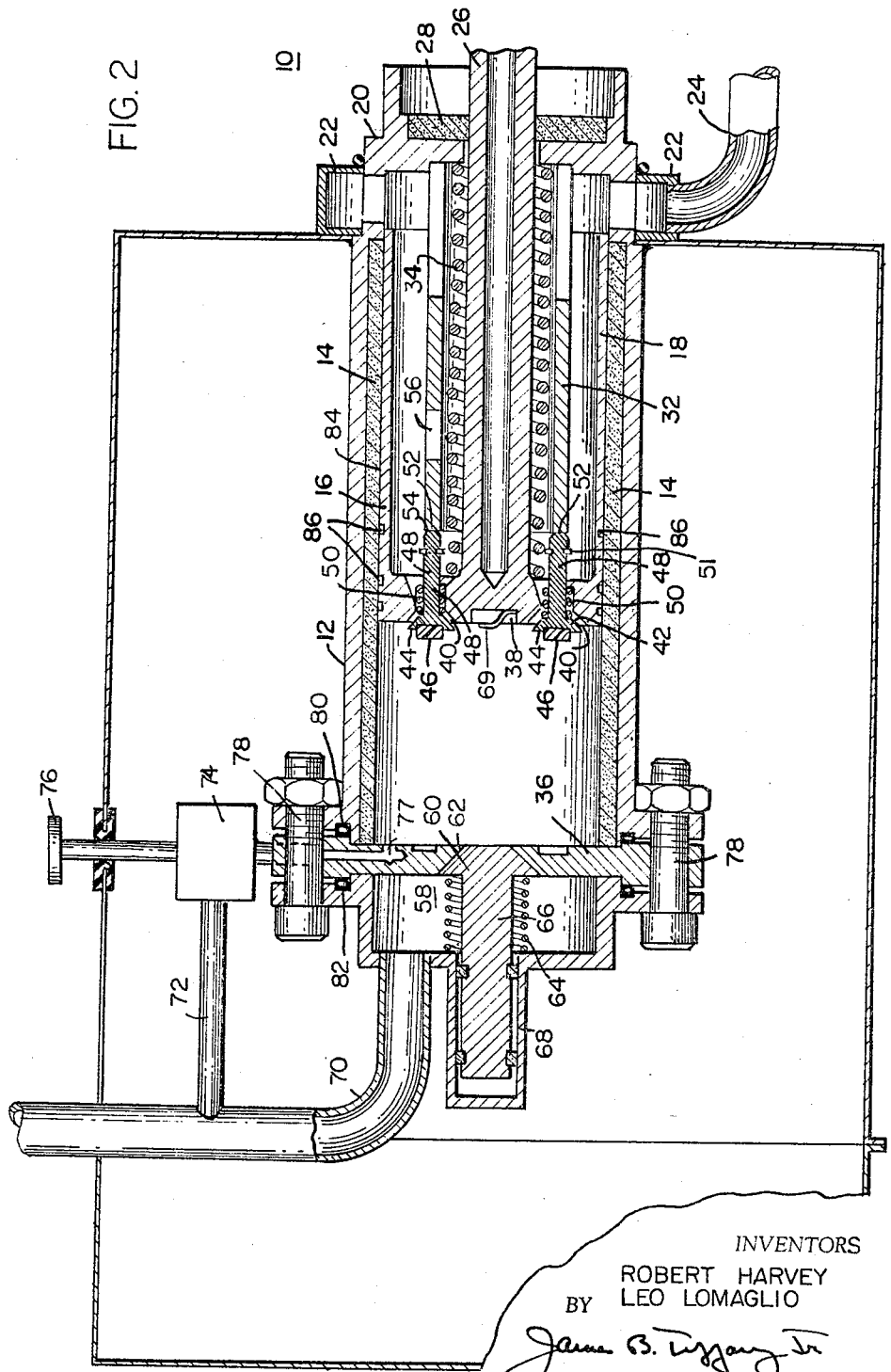

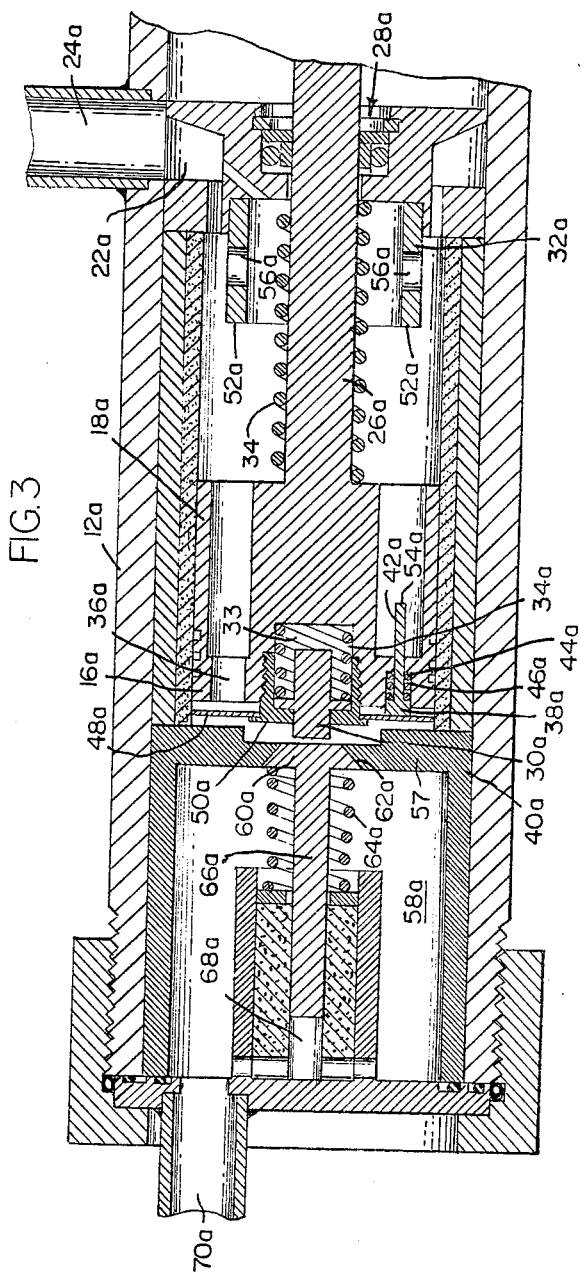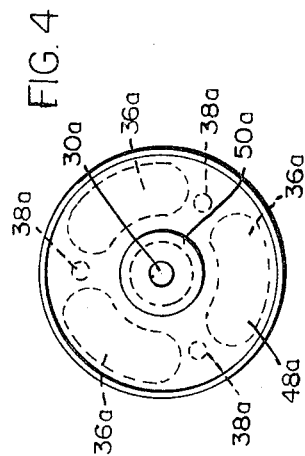

United States Patent Office 3,279,326
Patented Oct. 18, 1966

3,279,326
STEAM ENGINE WITH SELF-CONTAINED
VALVULAR MECHANISM
Robert Harvey, Sudbury, and Francis Leo Lo Maglio, Dracut, Mass., assignors to Thermo Electron Engineering Corp., a corporation of Massachusetts
Filed Feb. 10, 1964, Ser. No. 343,817
9 Claims. (Cl. 91—224)

This invention relates generally to steam engines and more particularly to a miniaturized steam engine adapted for use with a package or compact steam generator.

With the advent of military forces operating in remote regions of the world, a need has developed for a light weight, portable electrical generating unit that can be transported and operated by a field unit without the usual difficulties encountered in conventional electrical generating power unit. The usual difficulties which are inherent with conventional power plants are problems encountered with starting, ignition servicing, ingestion of water or other foreign matter into the exhaust or intake, hence into the engine.

Therefore, it is an object of this invention to provide a simple, novel and portable reciprocating steam engine which, adapted for use with a miniaturized steam generator, can be used for portable power generation.

Another object of this invention is to provide a direct expansion closed system uniflow type reciprocating steam engine without piston rings or conventional valve timing mechanisms.

Another object of this invention is to provide a reciprocating engine having a tuned admission valve.

A further object of this invention is to provide a reciprocating engine in which the possibilities of contamination of the boiler water is minimal, since the cycle is a closed cycle, which is hermetically sealed.

A further object of this invention is to provide a relatively silent prime mover adapted for use with an electrical generator.

Another object of this invention is to provide a reciprocating engine where the exhaust valve remains open during the return stroke thus maintaining the chamber at exhaust pressure and thus eliminating the back pressure on the piston during the return stroke.

Other objects of this invention will in part be obvious and will, in part, appear hereinafter.

Broadly stated, one feature of this invention is to provide a prime mover for use with a steam generator and in turn is utilized to drive an electrical generating unit which essentially must be portable and capable of relatively silent operation. Since the prime mover or engine can be operated in areas remote from repair and supply depots by average civilian and military personnel, a further requirement is simplicity in operation and a design that eliminates constant adjustment of valve timing and the like. Consequently, the invention consists of a miniaturized reciprocating steam engine in which the admission valve is actuated by the piston travel and the open-time is determined by the natural resonant frequency of the admission valve mechanism. The engine therefore operates in direct relationship thereto eliminating valve gearing or eccentrics. The exhaust valves are located on the face of the piston, and utilize the cut-off principle to obtain the maximum exhaust efficiency of the working fluid. Also taking into consideration the problems of initial cylinder condensation when the uni-flow principle is used, the exhaust valves and ports are thus distinct and further removed from the admission ports so that the terminating gradient existing between the cylinder walls and the admitting steam is kept at a minimum.

To the accomplishment of this and the foregoing related ends, the present invention then consists of the means hereinafter fully described and partially pointed out in the claims, the annexed drawings and the following description setting forth in detail certain means in the carrying out of the invention, such disclosed means illustrating however but one of the various ways in which the principle of the invention may be employed.

In the drawings:

FIG. 2 is a view in section of the reciprocating engine with the piston on the downward stroke or at bottom dead center.

FIG. 3 is a view in section of a modified form of the reciprocating engine.

FIG. 4 is a top plan view partially in section of the piston and exhaust valves of the modified form as shown in FIG. 3.

Figure 1:
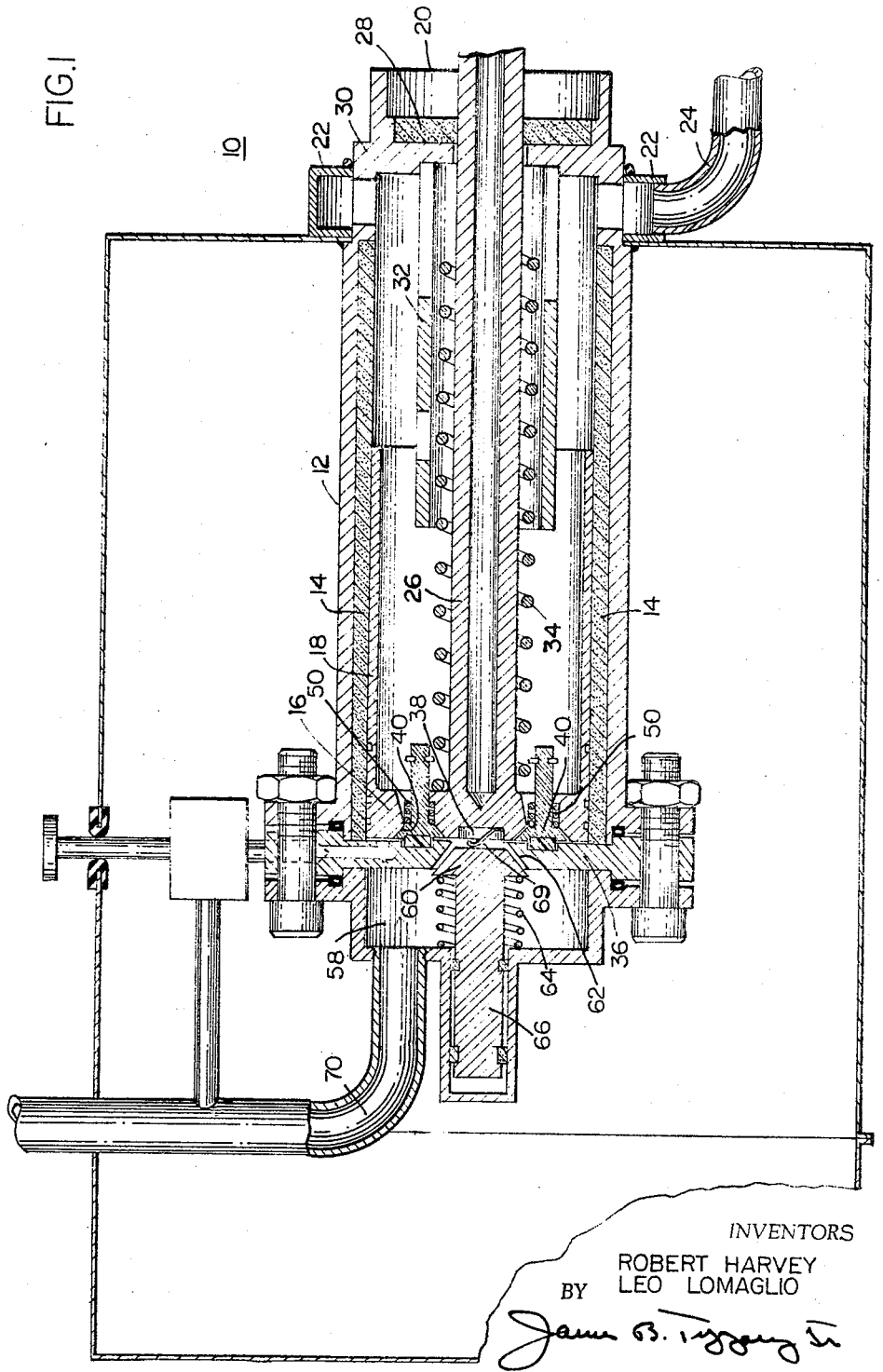
FIG. 1 is a view in section of the reciprocating engine with the piston at top dead center.

Reference is now to be had to the drawings wherein an illustrative embodiment of the reciprocating engine, a construction made in accordance with the present invention and designated by the numeral 10. The engine 10, consists primarily of a cylinder 12, with cylinder walls 14, formed of graphite of a pure high density or other materials having similar properties, and a piston 16, having a skirt 18, adapted for reciprocating movement within the cylinder 12. At one end 20, of the cylinder the exhaust manifold 22, is secured by any suitable means having piping 24, adapted to convey exhaust fluid to a condenser (not shown) or the atmosphere. The piston rod 26, extends from the piston 16, through the exhaust manifold 22, and through suitable seals 28, to a crank (not shown) where the reciprocating motion is converted to a rotating force through a cross-head, connecting rod and crankshaft (not shown) in the usual manner. Concentrically disposed within the cylinder and extending upward from the lower head 30, is a guide 32, which surrounds a portion of the length of the piston rod 26, to serve as a retainer for a spring member 34; the spring member 34, is concentrically disposed around the piston rod 26, and normally biases the piston in the direction of the top cylinder head 36.

As shown in FIG. 2, the piston 16, has a recess 38, formed in the upper lateral surface thereof for a purpose to be set forth more fully hereinafter. Radially spaced from said recess and diametrically opposed to each other are exhaust ports 40, having integral valve seats 42, positioned within said valve seats 42, and adapted to seat therewith are exhaust valves 44, having resilient, non-metallic blocks or springs 46, bonded or secured in the upper surfaces for a purpose to be set forth more fully hereinafter. The valves 44, have stems 48, extending through the exhaust ports with spring members 50, concentrically disposed there around and adapted to bias the valves 44, away from the valve seats 42, so that in a nonoperating condition or while the engine is at rest the exhaust valves 44, are normally open. The springs 50, are retained in assembly with the stems 48, by lock rings 51, snapped into engagement with the stems 48.

Extending upward from the guide 32, are positive valve operating stops 52, adapted to engage the bottom 54, of the stems 48, at or near the extreme end of the piston travel to ensure exhaust valve operation. Ports 56, are cut through the guide 32, to provide means for the egress of the exhaust steam into the cylinder proper. Positioned above the top cylinder head 36, is a steam admission chamber 58, having an admission valve 60, spring biased into engagement with a valve seat 62, formed in the cylinder head 36, by means of a spring 64. The admission valve 60, has a stem 66, maintained in alignment with the valve seat 62, by non-metallic blocks disposed within a guide 68. The lower surface of the valve 60, has a flat surface adapted for engagement with the spring disposed in the recess 38, formed in the head of the piston 16.

Suitable piping 70, conveys admission steam from the steam generator to the steam chamber 58, and has a suitable by-pass line 72, extending to initial metering valve 74. The by-pass line 72, is initiated by means of a push-button 76, to open suitable valves located within the starting chamber to permit the flow of a metered amount of steam to the cylinder through a port 77, when the admission valve 60, is closed and is used primarily at the initial starting periods.

The top cylinder head 36, and admission chamber 58, are secured to the cylinder by headbolts 78, and a seal there between effected by suitable gaskets 80 and 82.

The walls 84, of the piston 16, and the piston skirt have a series of pressure equalization grooves 86, formed therein to take the place of piston rings and by creating a turbulence between the piston skirt 18, and the cylinder side wall 14, in the fluid leaking past the piston restricts the flow and reduces fluid leakage and also equalizes the pressure around the periphery of the piston.

In FIG. 3, there is illustrated a modified form of the invention comprising a cylinder 12a, a piston 16a, having a skirt 18a, extending downwardly from the top surface thereof. At the lower end of the cylinder 12a, an exhaust manifold 22a, connects through suitable exhaust piping 24a, to either a condenser (not shown) or atmosphere. The piston rod 26a, extends from the piston 16a, downwardly through a spring loaded seal 28a, to a crank (not shown). Concentrically disposed in the center of the piston 16a, is a pin 30a which is biased in a direction away from the piston rod 26a, by means of a spring 33. The spring 33, is positioned within a recess, 34a, found within the piston and has a depth support to accommodate the pin when the spring is compressed. As shown in FIGS. 3 and 4, the surface of the piston 16a, has a series of exhaust ports 36a, formed therethrough providing a connection between the upper surface of the piston and the cylinder cavity. A set of three valve lifters 38a, are also disposed on the piston 16a, and extending therethrough. The valve lifters 38a, are spring biased in the direction of the cylinder head 40a, and consist of a shaft 42a, spring 44a, disposed within a recess 46a. The exhaust valve comprises a flat disc 48a, having a central aperture cut therein to allow the free movement of the pin 30a, without interference with the exhaust valve. The disc 48a, is superposed on the top surface of the piston and maintained in alignment therewith by the boss 50a, formed on the upper surface of the piston 16a. It will be apparent to anyone skilled in the art that the exhaust valve 48a, is allowed to float freely on the upper surface of the piston and will react to pressures on the upper surface thereof and to the valve lifters 38a At the bottom of the cylinder 12a, and extending upwardly therefrom are valve operating stop members 52a, which are adapted to engage the bottom surface 54a, of the valve lifters during the piston travel and to ensure positive opening of the exhaust valve. Ports 56a, are formed through the guide 32a, to permit the exhaust fluid and liquids which inadvertently collect them to flow or escape to the exhaust manifold 22a. The exhaust valve operation of this modified form of the invention is such that the usual operating fluid pressure prior to cut-off and during the working stroke maintains the exhaust valve in abutting relationship with the exhaust ports 36a, and prevents the operating fluid from passing therethrough. However, when the pressure of the operating fluid drops below a pre-determined pressure as a consequence of its expansion within the cylinder, the inherent resiliency of the springs 44a, of the valve lifters 38a, overcomes the pressure on the upper surface of the exhaust valve 48a, thereby lifting the valve away from the exhaust ports 36a, permitting flow therethrough. In the event that the valve 48a, remains closed due to the inability of the valve lifters 38a to overcome the pressure on the surface of the valve, the valve operating stop members 52a, engage the lower surface of the valve lifters, 38a, to positively lift the valve away from the ports 36a.

Positioned above the piston is a fluid receiving chamber 58a having a fluid admission valve seat 62a formed in the center of the lower wall 57. An admission valve 60, is adapted to seat therein and has a stem 66a, with a spring concentrically mounted therearound, biasing the valve 60a, into engagement with the valve seat 62a. A portion of the valve stem 66a, is positioned within a guide chamber 68a, so as to ensure alignment of the valve 60a, with the valve seat 62a.

The operation of the engine will now be described in view of the above description and the accompanying drawings. The working fluid is admitted to the receiving chamber 58, through the piping 70, and since the piston 16 is biased in the direction of the receiving chamber by the spring 34, the spring 69, is positioned within the recess 38, but partially extends above the top surface of the piston. When the piston is near top dead center, the spring 69, engages the bottom surface of the valve 60, and it is raised off its seat 62, overcoming the biasing action of the spring 64, on the stem 66, and the pressure of the working fluid on the back surface of the admission valve 60. Consequently the working fluid is allowed to pass through the valve seat 62, and start the piston 16, on its downward movement. As soon as the piston is removed from the contact with the valve 60, the valve closes due to the action of the spring and cut-off of the admission fluid is accomplished. The fluid such as steam or any suitable thermodynamic fluid having similar properties expands in the cylinder doing work by forcing the piston downward against the action of the spring 34, and the force of the connecting rod 26. In the process of doing this work the pressure of this fluid decreases to such a point that the exhaust valves 40, are able to overcome the decreased pressure on the upper surface by the action of their individual springs 50, and the exhaust valves open. The fluid is therefore allowed to exhaust through the exhaust ports to the lower part of the cylinder and then to the manifold 22, from there to atmosphere or to a condenser. After exhausting the fluid from the top of the piston the spring member 34, and the action of the crank forces the piston to the top of the cylinder for a repeat of the cycle. During the return upward stroke, the exhaust valves 44, remain open, thus retaining the pressure within the clinder 12, at exhaust pressure conditions, thus eliminating the usual back pressure on the piston during the compression stroke.

While there have been described herein what are at present considered to be preferred embodiments of the invention, it will be obvious to those skilled in the art that modifications and changes may be made without departing from the essence of the invention. It is therefore to be understood that the exemplary embodiments are illustrative and not restrictive of the invention, the scope of which is defined in the appended claims and that all modifications that come within the meaning and range of equivalency of the claims are intended to be included herein.

What is claimed is:

1. A reciprocating fluid engine comprising a cylinder having a head at one end, with a valve seat formed therein, a piston moveable in said cylinder and normally spring biased in the direction of said head, said valve seat extending through said head opposite said piston, a fluid receiving chamber axially positioned above said head containing an admission valve normally biased into engagement with said valve seat, means on said piston adapted to lift said admission valve when said piston is near top dead center, and exhaust ports disposed through said piston, exhaust valve means superposed on said ports and means to lift said exhaust valve means to effect efficient and effective exhausting through said piston.

2. A reciprocating uniflow fluid engine comprising a cylinder, a piston moveable within said cylinder, said piston normally biased toward one end of said cylinder, a fluid receiving chamber connected to said one end of the cylinder, the lower wall of said receiving chamber having a valve seat concentrically located therein and extending therethrough, an admission valve normally spring biased into engagement with said seat, means on said piston adapted for cooperative engagement with said valve and exhaust ports extending through said piston, an exhaust valve superposed on said piston and means carried by said piston for opening said exhaust valve.

3. A reciprocating uniflow engine as set forth in claim 1 where said piston has a skirt on which are located plurality of pressure equalization grooves formed in the periphery thereof.

4. A reciprocating uniflow steam engine including a cyinder having a manifold at one end thereof, a piston moveable within said cylinder being normally biased by a spring mounted concentrically on a piston rod in a direction away from said manifold, a receiving chamber positioned at the other end of said cylinder, a valve seat formed in one wall of said receiving chamber extending through into said cylinder, a fluid admission valve disposed within said receiving chamber normally biased into closed engagement with said seat, said piston having a series of circumferential grooves defining turbulence chambers on the periphery thereof, exhaust ports extending through said piston and exhaust valve means superposed over said ports and moveable with said piston and manually operative valve means for admitting a metered amount of fluid to said cylinder during the initial cycle.

5. A reciprocating steam engine including a cylinder having a manifold at one end thereof, a piston moveable within said cylinder being normally biased by a spring mounted concentrically on a piston rod in a direction away from said manifold, a receiving chamber positioned at the other end of said cylinder, a valve seat formed in one wall of said receiving chamber extending through into said cylinder, a fluid admission valve disposed within said receiving chamber normally biased into engagement within said seat, exhaust ports extending through said piston carrying exhaust valves moveable with said piston, said exhaust valves operative at a predetermined position of the piston stroke.

6. A reciprocating engine including a cylinder having an exhaust manifold at one end thereof, a piston moveable in said cylinder normally spring biased away from said manifold, a fluid receiving chamber positioned at the other end of said cylinder, a valve seat concentrically formed in one wall of said receiving chamber providing an opening into said cylinder, a fluid admission valve normally spring biased into engagement with said seat, resilent means extending above said piston adapted for striking engagement with said admission valve at a predetermined position of the stroke, exhaust ports extending through said piston and exhaust valve means carried by said piston and moveable therewith, plungers mounted on said piston normally biasing said exhaust valve means open whereby said exhaust valves are operative in response to pressure differentials on the piston surface.

7. A reciprocating fluid engine comprising a cylinder having a head at one end, with a valve seat formed therein, a piston movable in said cylinder and normally spring biased in the direction of said head, a fluid receiving chamber axially positioned above said head containing an admission valve normally biased into engagement with said valve seat, means on said piston adapted to lift said admission valve when said piston is near top dead center, and exhaust ports disposed through said piston, exhaust valve means superposed on said ports and means to lift said exhaust valve means in tuned resonance to the fluid pressure within said cylinder, said means on said piston adapted to lift said admission valve, including a plunger positioned within a recess formed in said piston, said plunger biased in the direction of said head by a spring disposed within said piston.

8. A reciprocating uniflow fluid engine comprising a cylinder, a piston movable within said cylinder, said piston normally biased toward one end of said cylinder, a fluid receiving chamber connected to said one end of the cylinder, the lower wall of said receiving chamber having a valve seat concentrically located therein, an admission valve normally spring biased into engagement with said seat, means on said piston adapted for cooperative engagement with said valve and exhaust ports extending through said piston, an exhaust valve superposed on said piston and means carried by said piston for opening said exhaust valve in tuned resonance to the pressure on said piston, said means for opening said exhaust valves comprise plungers normally spring biased in the direction of said exhaust valve and positioned within recesses formed within the piston head.

9. A reciprocating fluid engine comprising a cylinder having a head at one end, with a valve seat formed therein, a piston movable in said clinder and normally spring biased in the direction of said head, a fluid receiving chamber axially positioned above said head containing an admission valve normally biased into engagement with said valve seat, means on said piston adapted to lift said admission valve when said piston is near top dead center, and exhaust ports disposed through said piston, exhaust valve means superposed on said ports and means to lift said exhaust valve means in tuned resonance to the fluid pressure within said cylinder, said exhaust valve means comprise a disc superposed on said piston and freely movable longitudinally therewith, and plungers mounted on said piston being normally biased into enagement.

References Cited by the Examiner

UNITED STATES PATENTS

| | | | |
|---|---|---|---|
| 2,419,859 | 4/1947 | Tarr et al. | 91—229 |
| 2,649,078 | 8/1953 | Kelly | 91—229 |
| 2,671,434 | 3/1954 | Schmiedeskamp | 91—338 |
| 2,853,974 | 9/1958 | Hewitt | 91—31 |
| 3,094,938 | 6/1963 | Blomeke et al. | 91—229 |
| 3,118,348 | 1/1964 | Kline | 91—165 |

FOREIGN PATENTS 889,677  10/1963  France.

MARTIN P. SCHWADRON, *Primary Examiner.*

SAMUEL LEVINE, *Examiner.*

P. E. MASLOUSKY, *Assistant examiner.*